United States Patent
Hashimoto et al.

(10) Patent No.: US 12,088,155 B2
(45) Date of Patent: Sep. 10, 2024

(54) CIRCUIT AND METHOD FOR DRIVING STEPPING MOTOR

(71) Applicant: ROHM CO., LTD., Kyoto (JP)

(72) Inventors: Hiroki Hashimoto, Kyoto (JP);
Masanori Tsuchihashi, Kyoto (JP);
Mitsuo Okada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 151 days.

(21) Appl. No.: 17/831,803

(22) Filed: Jun. 3, 2022

(65) Prior Publication Data
US 2022/0294318 A1   Sep. 15, 2022

Related U.S. Application Data

(63) Continuation of application No. PCT/JP2020/044858, filed on Dec. 2, 2020.

(30) Foreign Application Priority Data

Dec. 5, 2019   (JP) .................................. 2019-220370

(51) Int. Cl.
*H02K 11/33* (2016.01)
*H02K 37/00* (2006.01)
*H02P 6/182* (2016.01)

(52) U.S. Cl.
CPC ............. *H02K 11/33* (2016.01); *H02K 37/00* (2013.01); *H02P 6/182* (2013.01)

(58) Field of Classification Search
CPC .......... H02K 11/33; H02K 37/00; H02P 6/182
See application file for complete search history.

(56) References Cited

U.S. PATENT DOCUMENTS

| 5,296,792 A * | 3/1994 | Knierim | H02P 7/04 318/400.4 |
| 6,288,507 B1 * | 9/2001 | Makino | H02P 7/04 388/806 |

(Continued)

FOREIGN PATENT DOCUMENTS

| JP | H09103096 A | 4/1997 |
| JP | 2000184789 A | 6/2000 |

(Continued)

OTHER PUBLICATIONS

International Search Report for International Application No. PCT/JP2020/044858; Date of Mailing, Jan. 19, 2021; PCT IPRP for for International Application No. PCT/JP2020/044858; Date of Mailing, May 17, 2022; and PCT Written Opinion of the International Searching Authority for International Application No. PCT/JP2020/044858; Date of Mailing Jan. 19, 2021.

(Continued)

*Primary Examiner* — Thai T Dinh
(74) *Attorney, Agent, or Firm* — CANTOR COLBURN LLP

(57) ABSTRACT

A driving circuit drives a stepping motor in synchronization with an input clock using a 2-phase excitation method. A constant current chopper circuit generates a pulse modulation signal such that the detection value of the coil current approaches a current setting value. A detection window generation circuit generates a detection window. The detection window becomes an open state at a timing at which the coil current $I_{OUT}$ becomes smaller than a predetermined threshold value. A logic circuit sets a full-bridge circuit to a high-impedance state when the detection window is in the open state and controls the full-bridge circuit according to the pulse modulation signal when the detection window is in the closed state. In the open state of the detection window, a back electromotive force (BEMF) detection circuit detects (Continued)

the BEMF of the coil. A current value setting circuit controls a current setting value based on the BEMF.

10 Claims, 9 Drawing Sheets

(56) References Cited

U.S. PATENT DOCUMENTS

| | | | |
|---|---|---|---|
| 8,072,177 B2* | 12/2011 | Arisawa | H02P 8/34 |
| | | | 318/685 |
| 11,264,926 B2* | 3/2022 | Hashimoto | H02P 6/182 |
| 2009/0066278 A1* | 3/2009 | Arisawa | H02P 8/22 |
| | | | 318/400.35 |
| 2009/0153093 A1* | 6/2009 | Pinewski | H02P 8/36 |
| | | | 318/696 |
| 2010/0177626 A1* | 7/2010 | Otaguro | H02P 6/18 |
| | | | 318/400.35 |
| 2015/0123591 A1* | 5/2015 | Inoue | H02P 8/12 |
| | | | 318/696 |

FOREIGN PATENT DOCUMENTS

| | | |
|---|---|---|
| JP | 2004120957 A | 4/2004 |
| JP | 2004180354 A | 6/2004 |
| JP | 2007267553 A | 10/2007 |
| JP | 2009065806 A | 3/2009 |
| JP | 6258004 B2 | 1/2018 |

OTHER PUBLICATIONS

JPO Notice of Reasons for Refusal for corresponding JP Application No. 2021-562686; Dated Jan. 9, 2024; 13 pages.

* cited by examiner

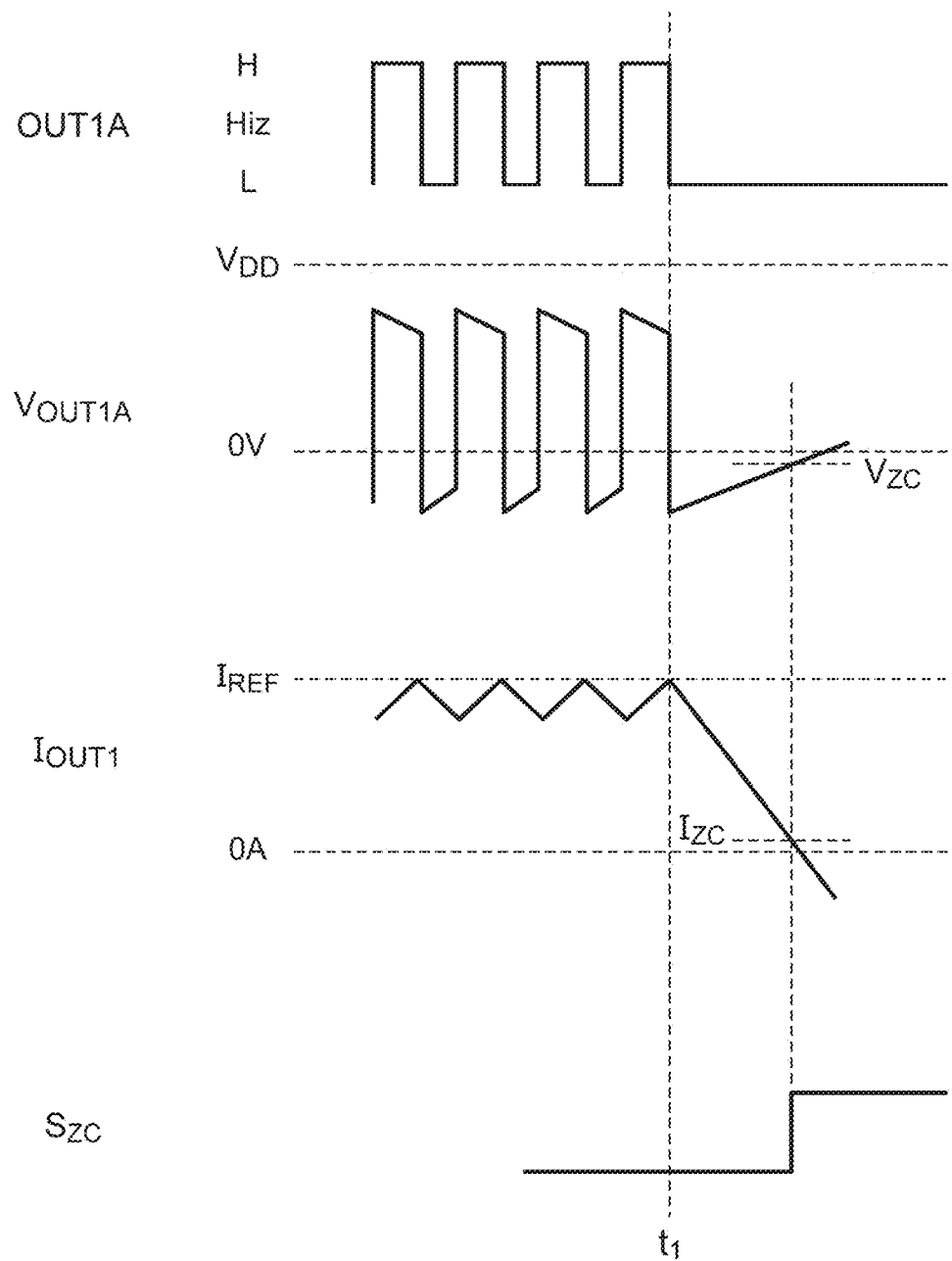

CIRCUIT AND METHOD FOR DRIVING STEPPING MOTOR

CROSS-REFERENCE TO RELATED APPLICATIONS

This application is a continuation under 35 U.S.C. § 120 of PCT/JP2020/044858, filed Dec. 2, 2020, which is incorporated herein by reference, and which claimed priority to Japanese Application No. 2019-220370, filed Dec. 5, 2019. The present application likewise claims priority under 35 U.S.C. § 119 to Japanese Application No. 2019-220370, filed Dec. 5, 2019, the entire content of which is also incorporated herein by reference.

BACKGROUND

1. Technical Field

The present disclosure relates to a driving technique for a stepping motor.

2. Description of the Related Art

Stepping motors are widely employed in electronic devices, industrial equipment, and robots. Such a stepping motor is configured as a synchronous motor that rotates in synchronization with an input clock generated by a host controller. A stepping motor has high controllability for starting, stopping, and positioning. Furthermore, a stepping motor supports position control using an open loop control method. In addition, a stepping motor has an advantage of high compatibility with digital signal processing.

FIG. 1 is a block diagram showing a motor system provided with a conventional stepping motor and a driving circuit thereof. A host controller 2 supplies an input clock CLK to a driving circuit 4. The stepping motor 6 includes a first coil L1 and a second coil L2. The position of a rotor of the stepping motor 6 is determined according to a combination of a current $I_{OUT1}$ that flows through the first coil L1 and a current $I_{OUT2}$ that flows through the second coil L2.

The driving circuit 4 includes full-bridge circuits 8_1 and 8_2 respectively coupled to the first coil L1 and the second coil L2. The driving circuit 4 changes the states of the two full-bridge circuits 8_1 and 8_2 in synchronization with the input clock CLK, so as to change the combination of the currents $I_{OUT1}$ and $I_{OUT2}$ (excitation position).

FIG. 2 is a diagram for explaining the excitation position. The excitation position can be understood as a combination of the coil currents (driving currents) $I_{OUT1}$ and $I_{OUT2}$ that respectively flow through the two coils L1 and L2 of the stepping motor 6. FIG. 2 shows eight excitation positions 1 through 8.

Several excitation methods are known for such a stepping motor. With the 1-phase excitation method, current is alternately applied to the first coil L1 and the second coil L2 such that transitions are made between excitation positions 2, 4, 6, and 8. With the 2-phase excitation method, current is applied to both the first coil L1 and the second coil L2 such that transitions are made between excitation positions 1, 3, 5, and 7. With the 1-2 phase excitation method, which is a combination of the 1-phase excitation method and the 2-phase excitation method, transitions are made between excitation positions 1 through 8. The microstep driving method is capable of controlling the excitation position with higher resolution.

FIG. 3 is an operation waveform diagram of the driving circuit using the 1-2 phase excitation method. In this example, the excitation positions 1 through 8 shown in FIG. 2 sequentially transit in a clockwise manner for every pulse of the clock CLK. OUT1A and OUT1B represent the state of the full-bridge circuit 8_1. OUT2A and OUT2B represent the state of the full-bridge circuit 8_2. Specifically, "H" represents the state in which a high-level voltage is output, "L" represents the state in which a low-level voltage is output, and "HZ" represents a high-impedance state.

In the normal state, the rotor of the stepping motor rotates synchronously in increments of a step angle in proportion to the number of input clocks. However, when a sudden change in the load or a sudden change in speed occurs, the stepping motor goes out of synchronization. Such a state will be referred to as "step-out". Once the stepping motor steps out, subsequently, a special operation is required in order to restore the stepping motor to a normal driving state. Thus, there is a demand for a technique for preventing step-out.

In a case in which the motor is driven with a constant high torque, this reduces the risk of step-out. However, as a tradeoff problem, this reduces efficiency. In a case in which the motor is driven with a low torque, this improves efficiency. However, such an arrangement has an increased risk of step-out. A technique (which will be referred to as the "high-efficiency mode" in this specification) has been proposed in Japanese Patent Application No. 6258004 in which the output torque (i.e., the amount of current) is optimized by feedback control while preventing step-out, so as to provide improved efficiency with reduced power consumption. In the high-efficiency mode, the back electromotive force that occurs in the coil of the motor is detected, and the load angle is estimated based on the back electromotive force. Furthermore, a current instruction value, i.e., the torque, is feedback-controlled such that the load angle thus estimated approaches a predetermined target value.

In order to detect the back electromotive force, the output of the bridge circuit coupled to the coil must be high-impedance. With the 1-phase excitation method or the 1-2 phase excitation method, when the excitation position is at 4 or 8, the full-bridge circuit 8_1 arranged on the coil L1 side becomes high-impedance. In this state, the back electromotive force of the coil L1 can be detected. In contrast, when the excitation position is at 2 or 6, the full-bridge circuit 8_2 arranged on the coil L2 side becomes high-impedance. In this state, the back electromotive force of the coil L2 can be detected. That is to say, the high-efficiency mode can be applied only in a case in which the 1-phase excitation method or the 1-2 phase excitation method is employed. In other words, the high-efficiency mode cannot be applied to the 2-phase excitation method in which current always flows through both 2-phase coils.

SUMMARY

The present disclosure has been made in order to solve such a problem.

An embodiment of the present disclosure relates to a driving circuit structured to drive a stepping motor in synchronization with an input clock using a 2-phase excitation method. The driving circuit includes: a constant current chopper circuit structured to generate a pulse modulation signal that is pulse-modulated such that a detection value of a coil current of the stepping motor approaches a current setting value; a detection window generation circuit structured to generate a detection window, wherein the detection window becomes an open state at a timing at which the coil current of the stepping motor becomes smaller than a predetermined threshold value; a logic circuit structured to set a full-bridge circuit coupled to the coil of the stepping motor to a high-impedance state when the detection window is in the open state, and to control the full-bridge circuit according to the pulse modulation signal when the detection window is in a closed state; a back electromotive force detection circuit structured to detect the back electromotive force of the coil when the detection window is in the open state; and a current value setting circuit structured to feedback control the current setting value based on the back electromotive force.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9 is a diagram for explaining detection of current zero-crossing by the zero-current detection circuit shown in FIG. 8.

DETAILED DESCRIPTION

Outline of Embodiments

Figure 1:
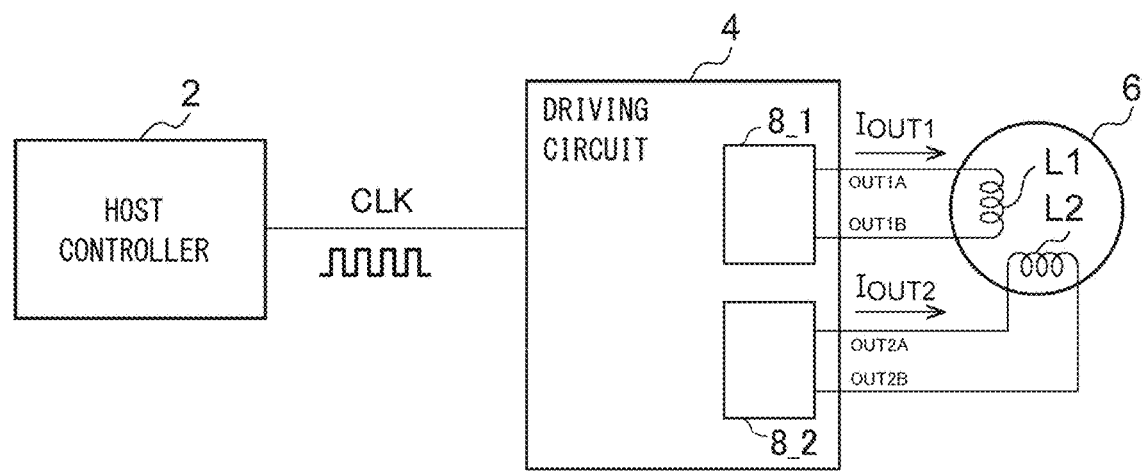
FIG. 1 is a block diagram showing a motor system provided with a conventional stepping motor and a driving circuit thereof.
Figure 2:
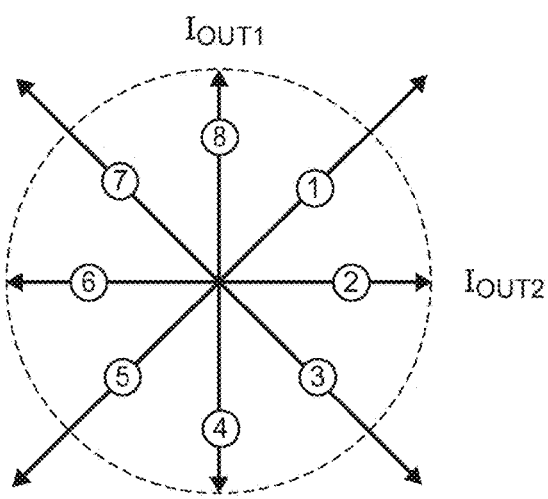
FIG. 2 is a diagram for explaining the excitation positions.
Figure 3:
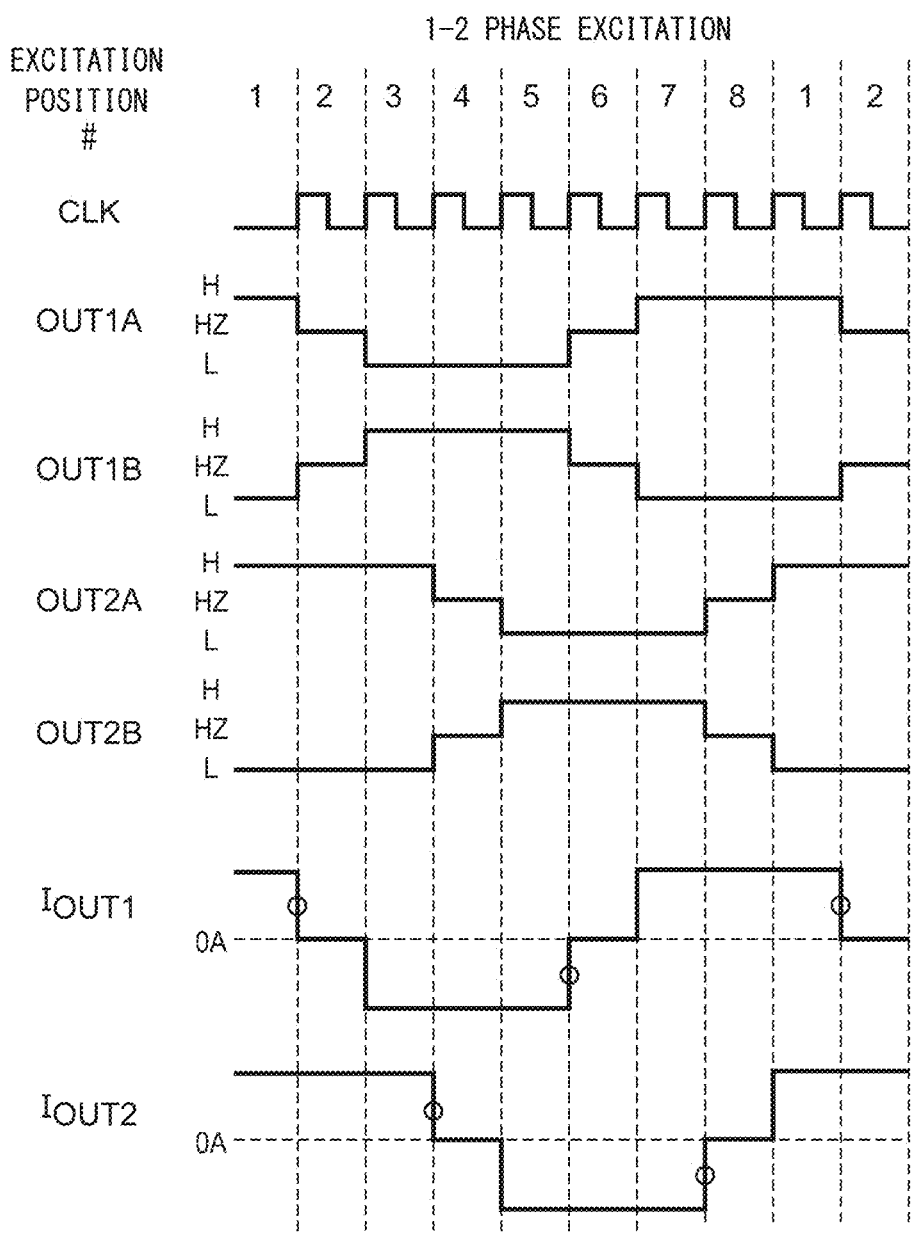
FIG. 3 is an operation waveform diagram of a driving circuit using a 1-2 phase excitation method.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

A driving circuit according to an embodiment drives a stepping motor in synchronization with an input clock using a 2-phase excitation method. The driving circuit includes: a constant current chopper circuit structured to generate a pulse modulation signal that is pulse-modulated such that a detection value of a coil current of the stepping motor approaches a current setting value; a detection window generation circuit structured to generate a detection window, wherein the detection window becomes an open state at a timing at which the coil current of the stepping motor becomes smaller than a predetermined threshold value; a logic circuit structured to set a full-bridge circuit coupled to the coil of the stepping motor to a high-impedance state when the detection window is in the open state, and to control the full-bridge circuit according to the pulse modulation signal when the detection window is in a closed state; a back electromotive force detection circuit structured to detect the back electromotive force of the coil when the detection window is in the open state; and a current value setting circuit structured to feedback control the current setting value based on the back electromotive force.

With the 2-phase excitation method, zero-crossing occurs in the coil current in the vicinity of a boundary between a given excitation position and another given excitation position. Accordingly, by detecting the zero-crossing of the coil current, and by providing a detection window for back electromotive force at a boundary between the excitation positions, such an arrangement is capable of detecting the back electromotive force with high precision while minimizing the effects on the constant current chopper control in the normal period. Such an arrangement is applicable to feedback control of the current instruction value in the high-efficiency mode.

In an embodiment, the driving circuit may further include a rotational speed detection circuit structured to detect a period that is inversely proportional to the rotational speed of the stepping motor. Also, a width of the detection window may be determined by multiplying the length of the period by a predetermined coefficient. This allows the ratio of the time width of the detection window to the rotational period to be stabilized.

In an embodiment, the driving circuit may further include a register structured to hold setting data of the coefficient. By rewriting the setting value stored in the register, this allows the length of the detection window to be controlled.

In an embodiment, when detection of the back electromotive force by the back electromotive force detection circuit is completed, the detection window may be ended. In this case, the width of the detection window can be kept to a minimum, thereby further suppressing the effects on the constant current chopper control.

In an embodiment, the driving circuit may further include a zero-current detection circuit structured to compare a current detection signal that corresponds to a voltage drop across a detection resistor provided to the full-bridge circuit with a threshold value, and to assert a zero-current detection signal when the current detection signal becomes smaller than the threshold value. Also, the detection window generation circuit may generate the detection window with an assertion of the zero-current detection signal as a start point of the detection window.

In an embodiment, the constant current chopper circuit may further include a comparator structured to compare a detection value of the coil current with a threshold value based on the current setting value; an oscillator structured to oscillate at a predetermined frequency; and a flip-flop structured to transit to an off level according to an output of the comparator, and to transit to an on level according to an output of the oscillator.

In an embodiment, the driving circuit may be monolithically integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors or capacitors may be arranged in the form of components external to such a semiconductor substrate in order to adjust the circuit constants. By integrating the circuit on a single chip, such an arrangement allows the circuit area to be reduced and allows the circuit elements to have uniform characteristics.

Embodiments

Description will be made below regarding preferred embodiments with reference to the drawings. In each drawing, the same or similar components, members, and processes are denoted by the same reference numerals, and redundant description thereof will be omitted as appropriate. The embodiments have been described for exemplary purposes only and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

Figure 4:
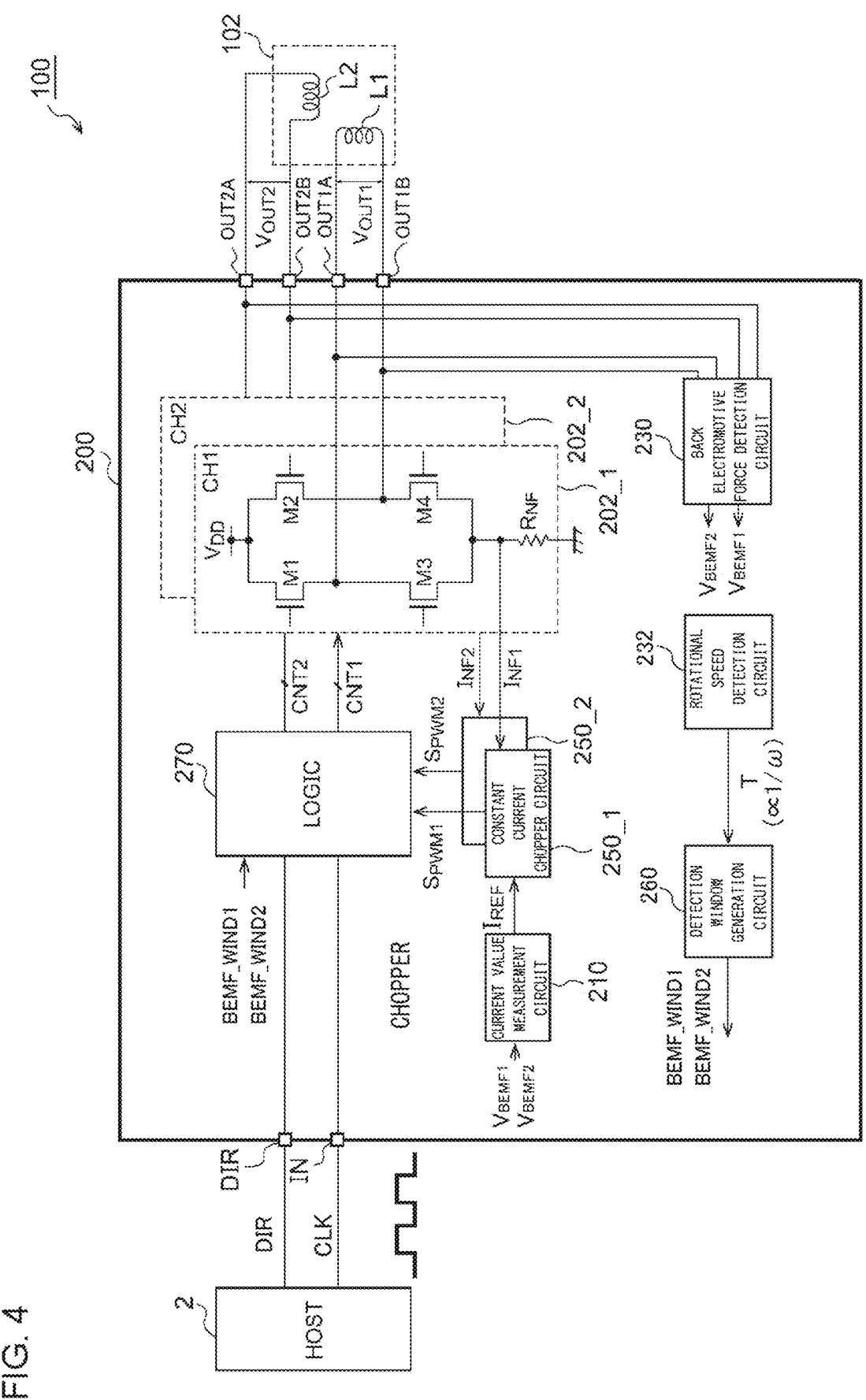
FIG. 4 is a block diagram showing a motor system provided with a driving circuit according to an embodiment.

FIG. 4 is a block diagram showing a motor system 100 provided with a driving circuit 200 according to an embodiment. The driving circuit 200 forms the motor system 100 together with a stepping motor 102 and a host controller 2. The stepping motor 102 may be configured as any one of a Permanent Magnet (PM) stepping motor, Variable Reluctance (VR) stepping motor, and Hybrid (HB) stepping motor.

An input clock CLK is input to an input pin IN of the driving circuit 200 from the host controller 2. Furthermore, a direction indication signal DIR is input to a direction indication pin DIR of the driving circuit 200 for indicating the rotation direction, i.e., either the clockwise (CW) direction or the counterclockwise (CCW) direction.

The driving circuit 200 rotates the rotor of the stepping motor 102 with a predetermined angle in a direction that corresponds to the direction indication signal DIR every time the input clock CLK is input.

The driving circuit 200 includes full-bridge circuits 202_1 and 202_2, a current value setting circuit 210, a back electromotive force detection circuit 230, a rotational speed detection circuit 232, constant current chopper circuits 250_1 and 250_2, a detection window generation circuit 260, and a logic circuit 270, which are monolithically integrated on a single semiconductor substrate.

In the present embodiment, the stepping motor 102 is configured as a 2-phase motor including a first coil L1 and a second coil L2. The driving circuit 200 is configured to be capable of driving the stepping motor 102 using 2-phase excitation.

The full-bridge circuit 202_1 of the first channel CH1 is coupled to the first coil L1. The full-bridge circuit 202_2 of the second channel CH2 is coupled to the second coil L2.

The full-bridge circuits 202_1 and 202_2 are each configured as an H-bridge circuit including four transistors M1 through M4. The transistors M1 through M4 of the full-bridge circuit 202_1 are switched on and off according to a control signal CNT1 received from the logic circuit 270. This switches on and off the voltage (which will also be referred to as a "first coil voltage") $V_{OUT1}$ to be applied to the first coil L1.

The full-bridge circuit 202_2 has the same configuration as that of the full-bridge circuit 202_1. The transistors M1 through M4 thereof are switched on and off according to a control signal CNT2 received from the logic circuit 270. This switches on and off the voltage (which will also be referred to as a "second coil voltage") $V_{OUT2}$ to be applied to the second coil L2.

The current value setting circuit 210 generates a current setting value $I_{REF}$. Immediately after the stepping motor 102 is started, the current setting value $I_{REF}$ is fixed at a predetermined value (which will be referred to as a "full-torque setting value") $I_{FULL}$. The predetermined value $I_{FULL}$ may be the maximum value in an allowed range of the current setting value $I_{REF}$. In this case, the stepping motor 102 is driven with full torque. This state will be referred to as a "high-torque mode".

After the stepping motor 102 starts to stably rotate, i.e., after the potential for step-out decreases, the stepping motor 102 is switched to the high-efficiency mode. In the high-efficiency mode, the current value setting circuit 210 adjusts the current setting value $I_{REF}$ by feedback control according to the back electromotive forces $V_{BEMF1}$ and $V_{BEMF2}$ of the coils L1 and L2. With this, power consumption is reduced.

During the energization of the first coil L1, the constant current chopper circuit 250_1 generates a pulse modulation signal $S_{PWM1}$ pulse modulated such that a detection value $I_{NF1}$ of the coil current $I_{OUT1}$ that flows through the first coil L1 approaches a target amount based on the current setting value $I_{REF}$. During the energization of the second coil L2, the constant current chopper circuit 250_2 generates a pulse modulation signal $S_{PWM2}$ pulse modulated such that a detection value $I_{NF2}$ of the coil current $I_{OUT2}$ that flows through the second coil L2 approaches the current setting value $I_{REF}$.

The detection method for the coil currents $I_{OUT1}$ and $I_{OUT2}$ is not restricted in particular. For example, the full-bridge circuits 202_1 and 202_2 may each include a current detection resistor $R_{NF}$. Also, the voltage drop across each current detection resistor $R_{NF}$ may be employed as a detection value of the corresponding coil current $I_{OUT}$. It should be noted that the position of each current detection resistor $R_{NF}$ is not restricted in particular. Specifically, each current detection resistor $R_{NF}$ may be provided on the power supply side. Also, each current detection resistor $R_{NF}$ may be arranged between two outputs OUT #A and OUT #B of the full-bridge circuit 202_# ("#" represents the channel number, i.e., 1 or 2) and such that it is arranged in series with the coil L #to be driven.

The logic circuit 270 switches on and off one of the outputs of the two legs of the full-bridge circuit 202_1 coupled to the first coil L1 according to the pulse modulation signal $S_{PWM1}$. Furthermore, the logic circuit 270 switches on and off one of the outputs of the two legs of the full-bridge circuit 202_2 coupled to the second coil L2 according to the pulse modulation signal $S_{PWM2}$.

The logic circuit 270 changes the excitation position every time the input clock CLK is input, so as to switch the voltages $I_{OUT1}$ and $I_{OUT2}$ respectively applied to the coils L1 and L2. The excitation position can be understood as a combination of the magnitude and the direction of the coil currents that flow through the first coil L1 and the second coil L2. The excitation position may be switched according to only a positive edge of the input clock CLK, or may be switched according to only a negative edge of the input clock CLK. Also, the excitation position may be switched according to both a positive edge and a negative edge.

The detection window generation circuit 260 generates a detection window with a timing at which the magnitude of the coil current $I_{OUT1}$ of the stepping motor 102 becomes smaller than a predetermined threshold value as a start point. For example, the detection window generation circuit 260 generates a pulse detection window signal BEMF_WIND1 that is set to a first level (e.g., high level) that indicates an open state during the detection period for the back electromotive force that occurs on the first coil L1 side, and that is set to a second level (e.g., low level) that indicates a closed state during a non-detection period other than the detection period. Similarly, the detection window generation circuit 260 generates a detection window with a timing at which the magnitude of the coil current $I_{OUT2}$ becomes smaller than a predetermined threshold value as a start point. The detection window signals BEMF_WIND1 and BEMF_WIND2 are supplied to the logic circuit 270.

In the open state of the detection window signal BEMF_WIND #, the logic circuit 270 sets the output of the corresponding full-bridge circuit 202_#to a high-impedance state. Furthermore, in the closed state of the detection window signal BEMF_WIND #, the logic circuit 270 controls the full-bridge circuit 202_#according to the pulse modulation signal $S_{PWM\#}$.

In the open state of the detection window signal BEMF_WIND #, the back electromotive force detection circuit 230 detects the back electromotive force $V_{BEMF\#}$ based on the terminal voltage of the coil L #. The back electromotive forces $V_{BEMF1}$ and $V_{BEMF2}$ are supplied to the current value setting circuit 210 in order to provide feedback control of the current setting value $I_{REF}$ in the high-efficiency mode.

The rotational speed detection circuit 232 acquires the rotational speed (angular speed ω) of the stepping motor 102 and generates a detection signal (rotational speed detection signal) that indicates the rotational speed ω. For example, the rotational speed detection circuit 232 may measure the period T (=2π/ω) that is inversely proportional to the reciprocal of the rotational speed ω, and may output the measurement value of the period T as the detection signal (period detection signal). In a situation in which step-out does not occur, the frequency (period) of the input pulse IN is proportional to the rotational speed (period) of the stepping motor 102. Accordingly, the rotational speed detection circuit 232 may measure the period of the input pulse IN or the period of an internal signal generated based on the input pulse IN and may employ the measurement value of the period as a period detection signal.

In the present embodiment, the period detection signal T is supplied to the detection window generation circuit 260. The detection window generation circuit 260 sets the width (detection period) of the open state of the detection window signal BEMF_WIND based on the period detection signal T. Specifically, the detection period (the width of the detection window) is determined by multiplying the length of the period T by a predetermined coefficient (k<1).

For example, the coefficient k may be set to $\frac{1}{32}$, $\frac{1}{16}$, $\frac{1}{8}$, $\frac{1}{4}$ (=$\frac{1}{2^n}$), or the like. In this case, by bit-shifting the digital value that represents the period T, such an arrangement is capable of acquiring the length of the detection period.

Figure 5:
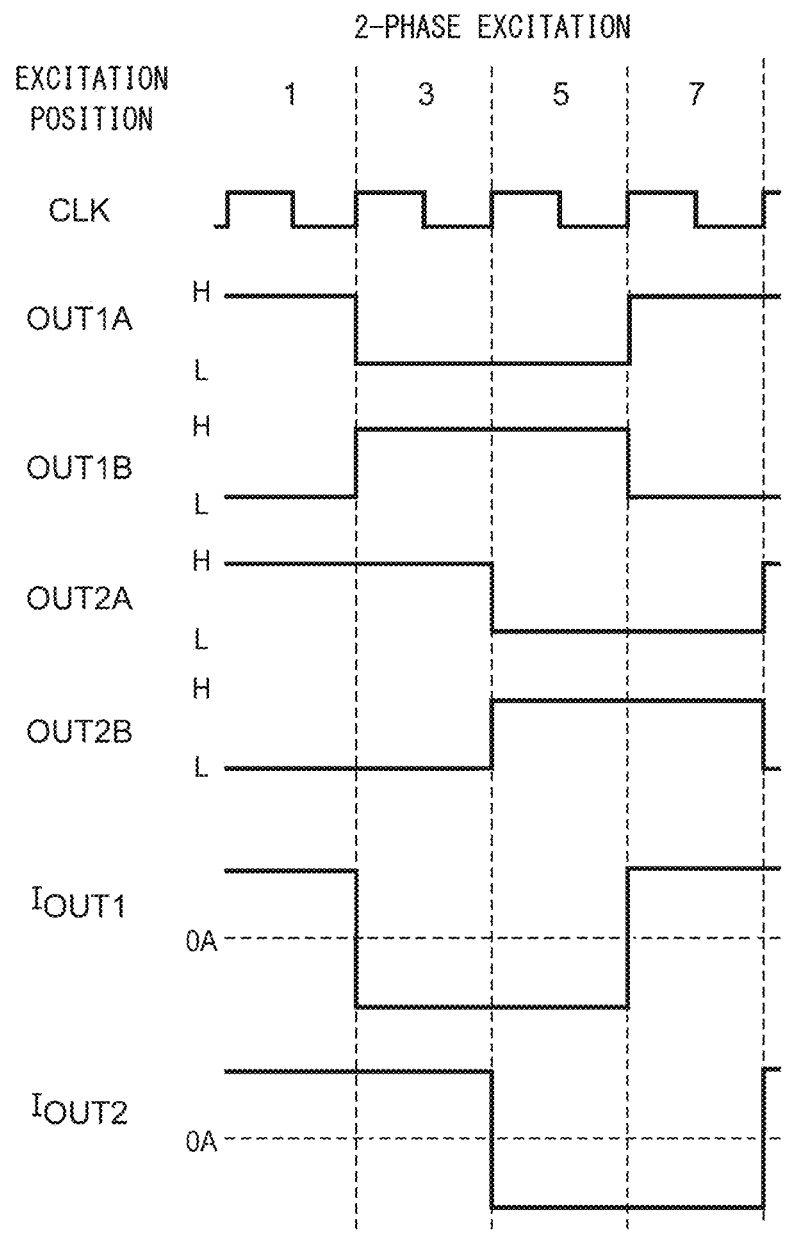
FIG. 5 is a simplified time chart of 2-phase excitation driving by the driving circuit shown in FIG. 4.

The above is the configuration of the driving circuit 200. Next, description will be made regarding the operation thereof. FIG. 5 is a simplified time chart showing the 2-phase excitation driving provided by the driving circuit 200 shown in FIG. 4. The logic circuit 270 changes the excitation position in the order of 1, 3, 5, and 7 (or in reverse order thereof).

Figure 6:
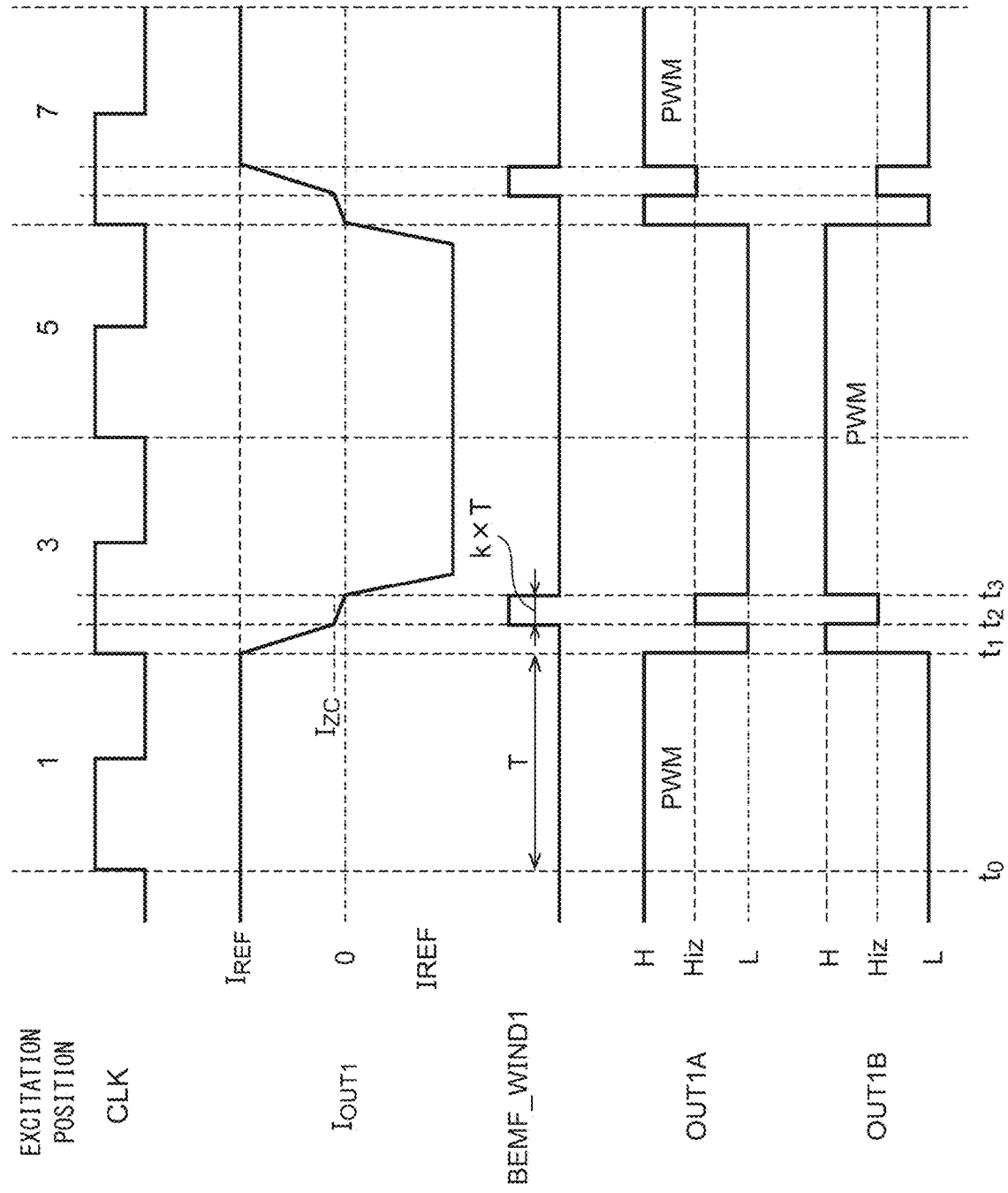
FIG. 6 is a waveform diagram for explaining detection of back electromotive force by the driving circuit shown in FIG. 4.

FIG. 6 is a waveform diagram for explaining the detection of the back electromotive force by means of the driving circuit 200 shown in FIG. 4. Description will be made below regarding the detection of the back electromotive force $V_{BEMF1}$ of the first coil L1 directing attention to the transition in the excitation position from 1 to 3 shown in FIG. 5.

At the time point $t_0$, transition occurs to excitation position 1. During excitation position 1, constant current chopper control is performed. Specifically, the constant current chopper circuit 250_1 generates the PWM signal $Sp_{PWM1}$ such that the coil current $I_{OUT1}$ approaches the current instruction value $I_{REF}$. The output OUT1A of the first leg (M1 and M3) of the full-bridge circuit 202_1 is switched on and off according to the PWM signal $S_{PWM1}$. On the other hand, the output OUT1B of the second leg (M2, M4) is fixed to the low level.

At the time point $t_1$, transition occurs to excitation position 3. In this stage, OUT1A becomes the low level, and OUT2A becomes the high level. In this state, the coil current IouTi starts to decrease.

When the coil current $I_{OUT1}$ crosses a threshold value in the vicinity of zero at the time point $t_2$, the detection window generation circuit 260 sets the detection window signal BEMF_WIND1 to the high level. At the time point $t_3$ after (k×T) elapses, the detection window generation circuit 260 sets the detection window signal BEMF_WIND1 to the low level. In this example, k=⅛ is employed.

During a period in which the detection window signal BEMF_WIND1 is set to the high level, i.e., in the open state of the detection window, the logic circuit 270 sets both OUT1A and OUT1B to the high-impedance state. In this state, the back electromotive force detection circuit 230 acquires the voltage difference between the voltages $V_{OUT1A}$ and $V_{OUT1B}$ at both ends of the first coil L1 as the back electromotive force $V_{BEMF1}$.

Alternatively, in the open state of the detection window, the output OUT1B of the full-bridge circuit 202_1 may be set to the high-impedance state, and the other output OUT1A may be set to the low level. During this period, the back electromotive force detection circuit 230 may acquire the terminal voltage $V_{OUT1B}$ on the OUT1B side of the first coil L1 as the back electromotive force $V_{BEMF1}$.

The current value setting circuit 210 updates the current instruction value $I_{REF}$ based on the back electromotive force $V_{BEMF1}$. The constant current chopper circuit 250_1 generates the PWM signal $S_{PWM1}$ such that the coil current Ioun approaches the current instruction value $I_{REF}$ thus updated. The output OUT1B of the second leg (M2, M4) of the full-bridge circuit 202_1 is switched on and off according to the PWM signal $S_{PWM1}$. On the other hand, the output OUT1A of the first leg (M1 and M3) is fixed to the low level.

The above is the operation of the driving circuit 200. With the 2-phase excitation method, the coil current $I_{OUT1}$ crosses zero in the vicinity of the boundary between a given excitation position (1) and another given excitation position (3). Accordingly, with such an arrangement in which the zero-crossing of the coil current $I_{OUT1}$ is detected, and the detection window for the back electromotive force $V_{BEMF1}$ is provided at a boundary between the excitation position (1) and the excitation position (3), this arrangement is capable of detecting the back electromotive force $V_{BEMF1}$ with high precision while minimizing the effect on the normal constant current chopper control. Such an arrangement is applicable to feedback control of the current instruction value in the high-efficiency mode.

As shown in FIG. 6, in addition to or instead of the detection window at a boundary between the excitation positions 1 and 3, a detection window may be provided at a boundary between the excitation positions 5 and 7. By increasing the number of the detection windows to two, this allows the control period of the current instruction value $I_{REF}$ to be shortened in the high-efficiency mode, thereby providing improved responsiveness.

Description has been made above regarding the detection of the back electromotive force of the first coil L1. Also, the back electromotive force may be detected for the second coil L2 in the same manner.

Figure 7:
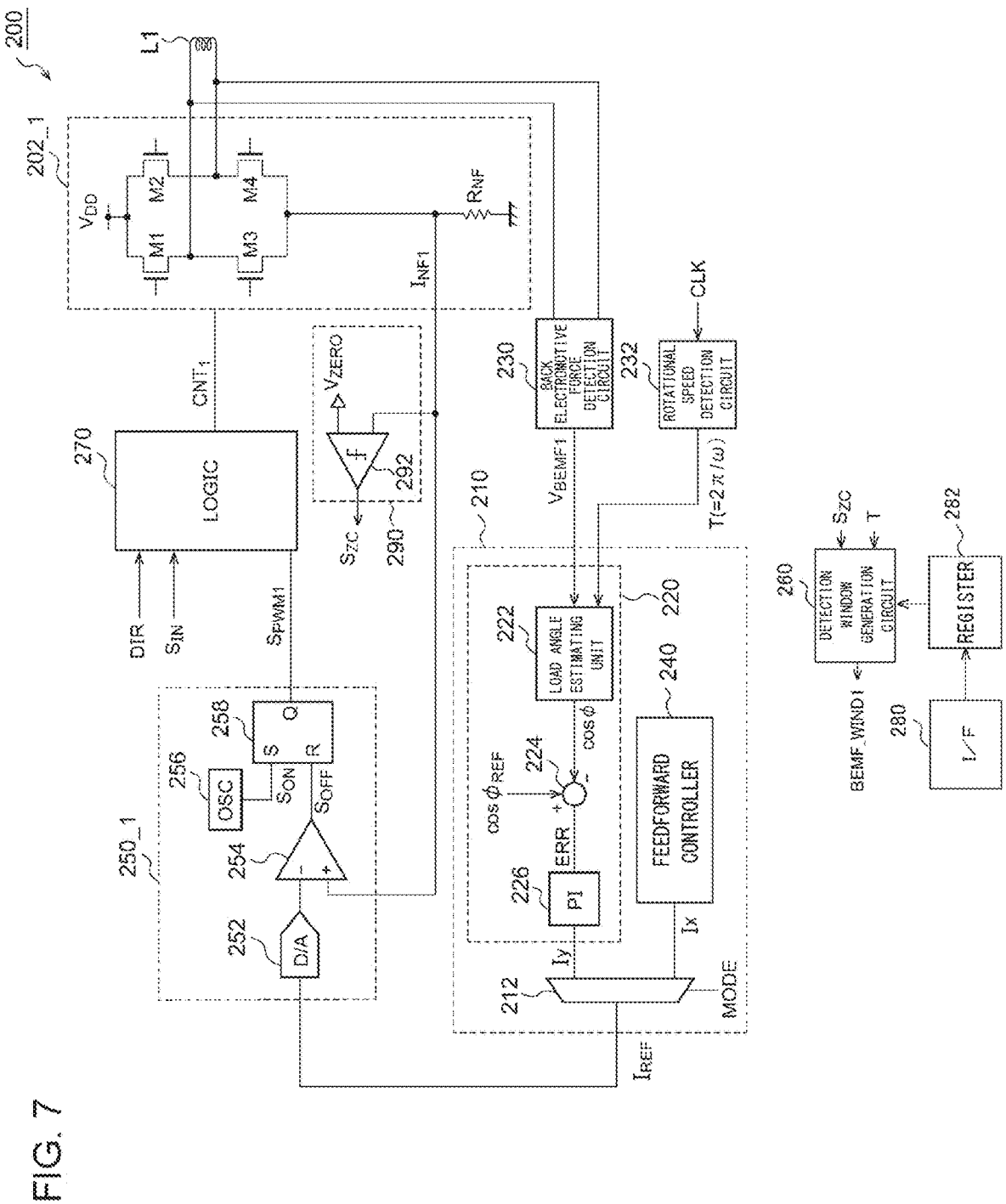
FIG. 7 is a circuit diagram showing an example configuration of the driving circuit.

FIG. 7 is a circuit diagram showing an example configuration of the driving circuit 200. FIG. 7 shows only a portion relating to the first coil L1.

Description will be made regarding the current value setting circuit 210. The current value setting circuit 210 includes a feedback controller 220, a feedforward controller 240, and a multiplexer 212. The feedforward controller 240 outputs a fixed current setting value Ix (=$I_{FULL}$) to be used in the high-torque mode immediately after the startup operation. The current setting value Ix is set to a large value in order to prevent step-out.

In the high-efficiency mode, the feedback controller 220 is activated. In this state, the feedback controller 220 outputs a current setting value Iy that is feedback-controlled based on the back electromotive force $V_{BEMF}$.

The multiplexer 212 selects one from among the two signals Ix and Iy according to a mode selection signal MODE, and outputs the signal thus selected as the current setting value $I_{ref}$.

The feedback controller 220 includes a load angle estimation unit 222, a subtractor 224, and a PI (proportional-integral) controller 226.

The feedback controller 220 generates a current setting value Iy such that the estimated load angle φ approaches a predetermined target angle $φ_{REF}$. Specifically, the subtractor 224 generates an error ERR between a detection value cos φ that corresponds to the load angle φ and the target value cos($φ_{REF}$) thereof. The PI controller 226 performs PI control calculation such that the error ERR becomes zero, so as to generate the current setting value Iy. The processing of the feedback controller 220 can be provided by an analog circuit employing an error amplifier.

The constant current chopper circuit 250_1 includes a D/A converter 252, a PWM comparator 254, an oscillator 256, and a flip-flop 258. The D/A converter 252 converts the current setting value $I_{REF}$ into an analog voltage $V_{REF}$. The PWM comparator 254 compares the feedback signal $I_{NF1}$ with the reference voltage $V_{REF}$. When $I_{NF1}$>$V_{REF}$ holds true, the PWM comparator 254 asserts (sets to the high level) the off signal $S_{OFF}$. The oscillator 256 generates a periodic on signal $S_{ON}$ that determines the chopping frequency. The flip-flop 258 generates the PWM signal $S_{PWM1}$ that transits to the on level (e.g., high level) according to the on signal $S_{ON}$, and transits to the off level (e.g., low level) according to the off signal $S_{OFF}$.

As described above, the back electromotive force detection circuit 230 detects the back electromotive force $V_{BEMF1}$ ($V_{BEMF2}$) that occurs in the coil L1 (L2) of the stepping motor 102.

The rotational speed detection circuit 232 acquires the rotational speed (angular speed ω) of the stepping motor 102 and generates a detection signal that indicates the angular speed ω. For example, the rotational speed detection circuit 232 may measure a period T (=2π/ω) that is proportional to the reciprocal of the rotational speed ω, and may output the measurement value of the period T as the detection signal. In a situation in which step-out has not occurred, the frequency (period) of the input pulse IN is proportional to the rotational speed (period) of the stepping motor 102. Accordingly, the rotational speed detection circuit 232 may measure the period of the input pulse IN or the period of an internal signal generated based on the input pulse IN and may employ the measurement value of the period as the detection signal.

The load angle estimation unit 222 estimates the load angle φ based on the back electromotive force $V_{BEMF}$ and the rotational speed ω. The load angle φ corresponds to the difference between the current vector determined by the driving current that flows through the first coil L1 (i.e., position instruction) and the position of the rotor (mover). The back electromotive force $V_{BEMF1}$ is represented by the following Expression (1).

$$V_{BEMF}=K_E \cdot \omega \cdot \cos \phi \qquad (1)$$

Here, $K_E$ represents the back electromotive force constant, and ω represents the rotational speed. Accordingly, by measuring the back electromotive force $V_{BEMF}$ and the rotational speed ω, a detection value having a correlation with the load angle φ can be generated. For example, cos φ, may be employed as the detection value. In this case, the detection value is represented by the following Expression (2).

$$\cos \phi = V_{BEMF} \cdot \omega^{-1}/K_E = V_{BEMF} \cdot (T/2\pi) \cdot K_E^{-1} \qquad (2)$$

When the absolute value of the coil current IouTi becomes smaller than a predetermined threshold $I_{ZERO}$, the zero-current detection circuit 290 asserts (sets to the high level, for example) a zero current detection signal $S_{ZC}$. The zero-current detection circuit 290 may include a comparator 292 that compares the current detection signal $I_{NF1}$ that corresponds to the voltage drop across the detection resistor $R_{NF}$ provided to the full-bridge circuit 202_1 with a threshold voltage $V_{ZERO}$. However, the present invention is not restricted to such an arrangement. The detection window generation circuit 260 generates the detection window with an assertion of the zero current detection signal $S_{ZC}$ as the start point of the detection window.

The driving circuit 200 includes an interface circuit 280 and a register 282. The interface circuit 280 receives the setting data of the coefficient k from an external processor (e.g., the host controller 2 shown in FIG. 4). The register 282 holds the setting data received by the interface circuit 280. The kind of the interface is not restricted in particular. For example, an Inter IC (I²C) interface or a Serial Peripheral Interface (SPI) may be employed.

Description has been made above regarding the embodiments. The above-described embodiments have been described for exemplary purposes only. It can be readily conceived by those skilled in this art that various modifications may be made by making various combinations of the aforementioned components or processes, which are also encompassed in the technical scope of the present invention. Description will be made below regarding such modifications.

Modification 1

Description has been made regarding an example in which, in the driving circuit 200 shown in FIG. 7, the zero-current detection circuit 290 detects the zero-crossing of the coil current $I_{OUT1}$ based on the voltage drop across the current detection resistor $R_F$. However, the present invention is not restricted to such an arrangement. For example, the zero-current detection circuit 290 may detect the zero-crossing of the coil current $I_{OUT1}$ based on the terminal voltage of the coil L1.

Figure 8:
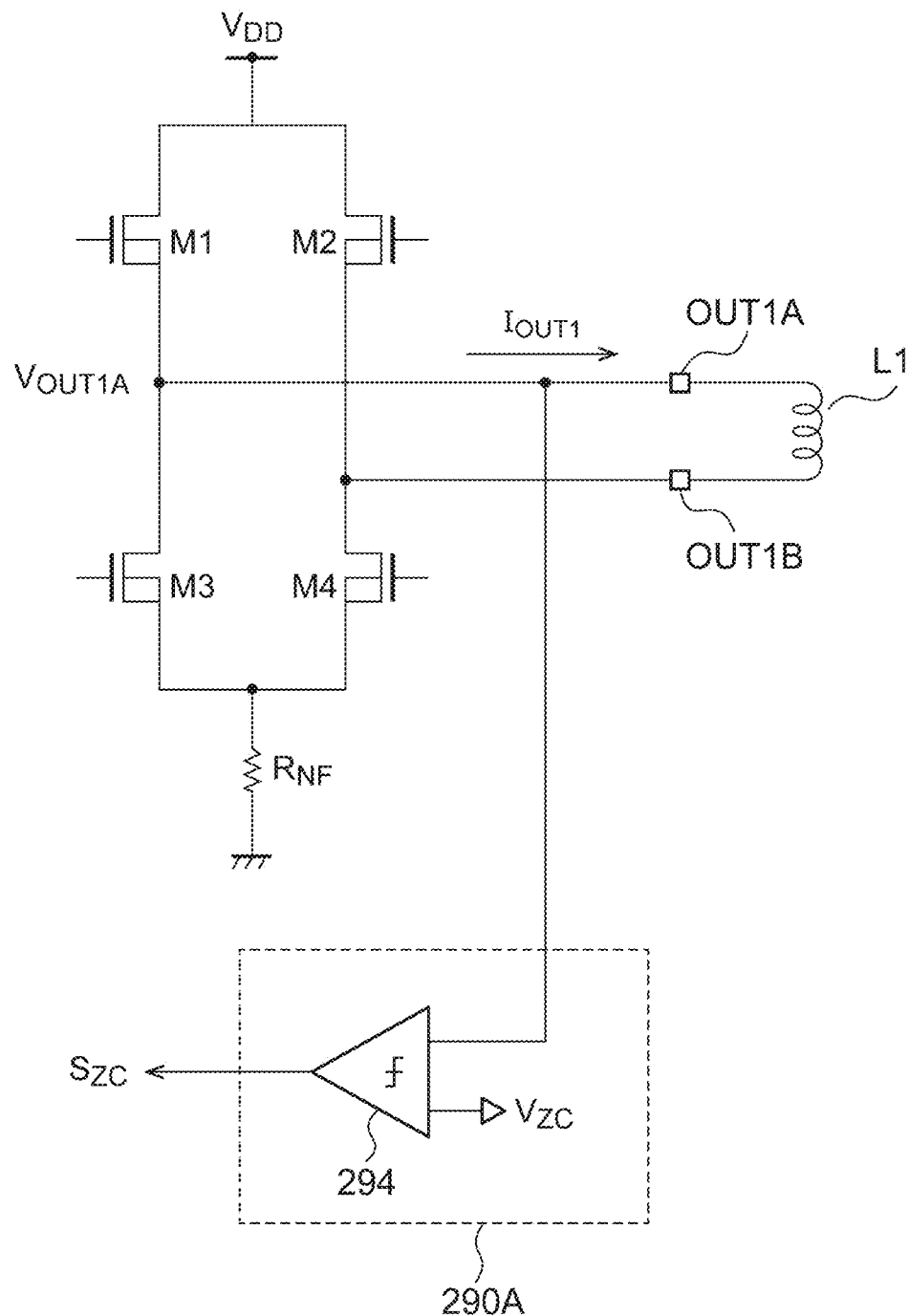
FIG. 8 is a circuit diagram showing a zero-current detection circuit according to a modification.

FIG. 8 is a circuit diagram showing a zero-current detection circuit 290A according to a modification. The zero-current detection circuit 290 includes a comparator 294 that compares the terminal voltage $V_{OUT1A}$ of the coil L1 with a threshold voltage $V_{ZC}$ in the vicinity of zero.

FIG. 9 is a diagram for explaining the detection of the current zero-crossing by the zero-current detection circuit 290A shown in FIG. 8. During a period before the time point $t_0$, the OUT1A side is chopper-controlled according to the PWM signal. In the high period of the PWM signal, the terminal voltage $V_{OUT1A}$ is represented by the following Expression (3).

$$V_{OUT1A} = V_{DD} - R_{ON1} \times I_{OUT1} \ldots \quad (3)$$

Here, $R_{ON1}$ represents the on resistance of the transistor M1. On the other hand, in the low period of the PWM signal, the terminal voltage $V_{OUT1A}$ is represented by the following Expression (4).

$$V_{OUT1A} = -(R_{NF} + R_{ON3}) \times I_{OUT1} \quad (4)$$

Here, $R_{ON3}$ represents the on resistance of the transistor M3.

When OUT1A becomes low and OUT1B becomes high at the time point $t_1$, the coil current $I_{OUT1}$ starts to decrease. In this state, the voltage $V_{OUT1A}$ at the OUT1A terminal is represented by Expression (4). Accordingly, the terminal voltage $V_{OUT1A}$ increases according to a decrease of the coil current $I_{OUT1}$. When the coil current $I_{OUT1}$ decreases to the threshold value $I_{ZC}$ in the vicinity of zero, the terminal voltage $V_{OUT1A}$ crosses the threshold value $V_{ZC}$ that corresponds to the current $I_{ZC}$. In this stage, the zero-current detection signal $S_{ZC}$ is asserted.

Modification 2

Description has been made in the embodiment regarding an arrangement in which the width of the detection window is changed according to the rotational speed of the stepping motor 102. However, the present invention is not restricted to such an arrangement. For example, when the detection of the back electromotive force $V_{BEMF}$ by the back electromotive force detection circuit 230 is completed, the detection window generation circuit 260 may end the detection window. In this case, this allows the width of the detection window to be kept to a minimum, thereby further suppressing the effect on the constant current chopper control.

Modification 3

The full-bridge circuit 202 may be configured as a chip that differs from the driving circuit 200. Also, the full-bridge circuit 202 may be configured as a discrete component.

Modification 4

The generating method for the current setting value Iy in the high-efficiency mode is not restricted to such an arrangement described in the embodiment. For example, the target value $V_{BEMF(REF)}$ of the back electromotive force $V_{BEMF1}$ may be determined. In this case, a feedback loop may be configured such that the back electromotive force $V_{BEMF1}$ approaches the target value $V_{BEMF(REF)}$.

Modification 5

Description has been made in the embodiment regarding an arrangement in which the feedback controller 220 is configured as a PI controller. However, the present invention is not restricted to such an arrangement. Also, a PID controller or the like may be employed.

Figure 10A:
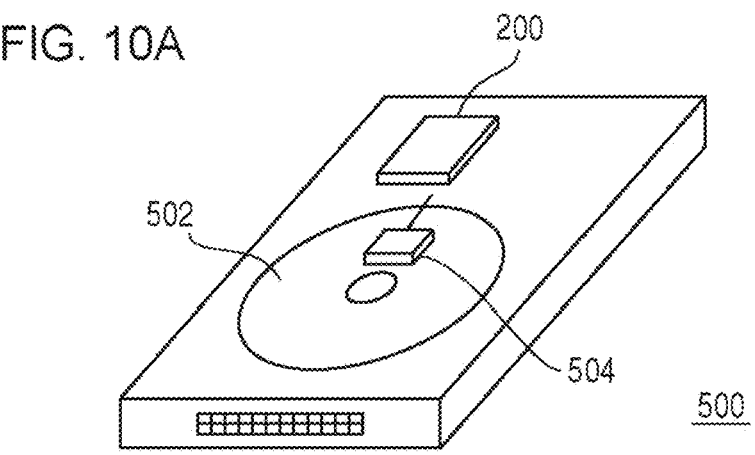
FIGS. 10A through FIG. 10C are perspective diagrams each showing an example of an electronic device provided with the driving circuit.
Figure 10B:
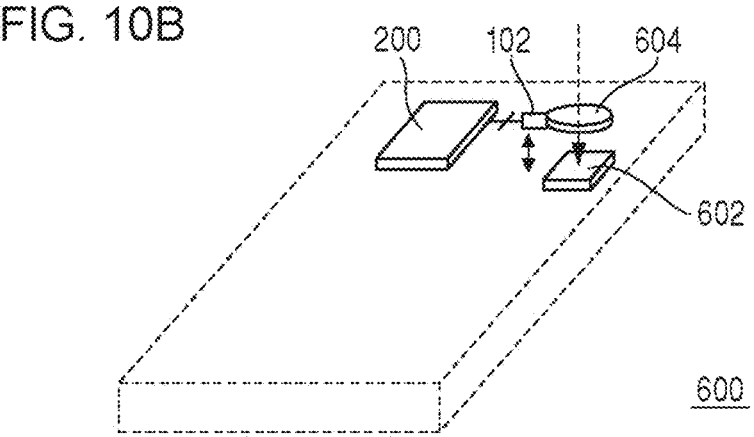
Figure 10C:
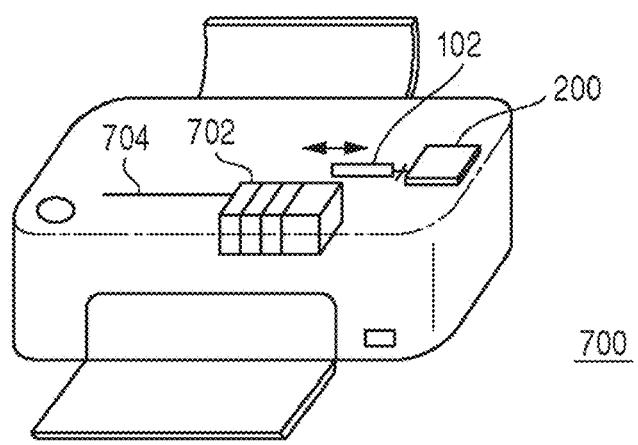

Lastly, description will be made regarding the usage of the driving circuit 200. The driving circuit 200 is employed in various kinds of electronic devices. FIG. 10A through FIG. 10C are perspective views each showing an example of an electronic device including the driving circuit 200.

An electronic device shown in FIG. 10A is configured as an optical disk apparatus 500. The optical disk apparatus 500 includes an optical disk 502 and a pickup head 504. The pickup head 504 is provided so as to allow data to be read from and written to the optical disk 502. The pickup head 504 is configured such that it can be moved over the recording face of the optical disk 502 in the radial direction of the optical disk (tracking). Furthermore, the pickup head 504 is configured such that the distance between it and the optical disk can be adjusted (focusing). Positioning of the pickup head 504 is performed by an unshown stepping motor. The driving circuit 200 controls the stepping motor. Such a configuration provides high-precision positioning of the pickup head 504 with high efficiency while suppressing step-out.

An electronic device shown in FIG. 10B is configured as a device 600 having an image pickup function such as a digital still camera, a digital video camera, a cellular phone terminal, etc. The device 600 includes an image pickup device 602 and an autofocus lens 604. The stepping motor 102 is used to perform positioning of the autofocus lens 604. With such a configuration in which the stepping motor 102 is driven by the driving circuit 200, such an arrangement provides high-precision positioning of the autofocus lens 604 with high efficiency while suppressing step-out. In addition to the driving operation for the autofocus lens, such a driving circuit 200 may be employed to drive an image stabilization lens. Also, the driving circuit 200 may be employed to control an aperture.

An electronic device shown in FIG. 10C is configured as a printer 700. The printer 700 includes a print head 702 and a guide rail 704. The print head 702 is supported so as to provide positioning of the print head 702 along the guide rail 704. The stepping motor 102 controls the position of the print head 702. The driving circuit 200 controls the operation of the stepping motor 102. Such a configuration provides high-precision positioning of the print head 702 with high efficiency while suppressing step-out. In addition to the driving operation for driving the print head 702, the driving circuit 200 may be employed in order to drive a motor provided for a sheet feeding mechanism.

The usage of the driving circuit 200 is not restricted to such consumer devices shown in FIGS. 10A through FIG. 10C. Also, the driving circuit 200 is suitably applicable to industrial equipment and robots.

The embodiments show only the mechanisms and applications of the present invention. Rather, various modifications and various changes in the layout can be made without departing from the spirit and scope of the present invention defined in appended claims.

What is claimed is:

1. A driving circuit structured to drive a stepping motor in synchronization with an input clock using a 2-phase excitation method, the driving circuit comprising:
   a constant current chopper circuit structured to generate a pulse modulation signal that is pulse-modulated such that a detection value of a coil current of the stepping motor approaches a current setting value;
   a detection window generation circuit structured to generate a detection window, wherein the detection window becomes an open state at a timing at which the coil current of the stepping motor becomes smaller than a predetermined threshold value;
   a logic circuit structured, (i) when the detection window is in the open state, (ii) when the detection window is in a closed state, to assign one output of the full-bridge circuit to a high-output state, to assign the other output of the full-bridge circuit to a low-output state, and to perform switching the one output according to the pulse modulation signal, and to fix the other output to a low level;
   a back electromotive force detection circuit structured to detect a back electromotive force of the coil when the detection window is in the open state; and
   a current value setting circuit structured to feedback control the current setting value based on the back electromotive force,
   wherein, (i) in advance of detecting a current zero-cross, the logic circuit inverts the assignments of the high-output/low-output states to the outputs of the full-bridge circuit respectively in response to a positive edge of the input clock, and stops to perform switching the output of the full-bridge circuit newly assigned to the high-output state to a high-level with fixing to a high level, so as to reduce the coil current,
   (ii) the detection window generation circuit sets the detection window to the open state when the coil current crosses the threshold value, and
   (iii) at the closing of the detection window, the logic circuit restores the assignments of the high-output/low-output states respectively as in the previous closed state of the detection window and restart the switching the output of the full-bridge circuit assigned to the high-output state.

2. The driving circuit according to claim 1, further comprising a rotational speed detection circuit structured to detect a period that is inversely proportional to a rotational speed of the stepping motor,
   wherein a width of the open state of the detection window is determined by multiplying a length of the period by a predetermined coefficient.

3. The driving circuit according to claim 2, further comprising:
   an interface circuit structured to receive setting data of the coefficient; and
   a register structured to hold the setting data received by the interface circuit.

4. The driving circuit according to claim 1, wherein, when detection of the back electromotive force by the back electromotive force detection circuit is completed, the detection window becomes the closed state.

5. The driving circuit according to claim 1, further comprising a zero-current detection circuit structured to compare a current detection signal that corresponds to a voltage drop across a detection resistor provided to the full-bridge circuit with a threshold value, and to assert a zero-current detection signal when the current detection signal becomes smaller than the threshold value,
   wherein the detection window generation circuit makes the detection window in the open state in response to an assertion of the zero-current detection signal.

6. The driving circuit according to claim 1, further comprising a zero-current detection circuit structured to compare a terminal voltage of the coil with a threshold voltage, and to assert a zero-current detection signal when the terminal voltage of the coil crosses the threshold voltage,
   wherein the detection window generation circuit makes the detection window in the open state in response to an assertion of the zero-current detection signal.

7. The driving circuit according to claim 1, wherein the constant current chopper circuit comprises:
   a comparator structured to compare a detection value of the coil current with a threshold value based on the current setting value;
   an oscillator structured to oscillate at a predetermined frequency; and
   a flip-flop structured to transit to an off level according to an output of the comparator, and to transit to an on level according to an output of the oscillator.

8. The driving circuit according to claim 1, monolithically integrated on a single semiconductor substrate.

9. An electronic device comprising:
   a stepping motor; and
   the driving circuit according to claim 1, structured to drive the stepping motor.

10. A driving method for driving a stepping motor based on a 2-phase excitation method in synchronization with an input clock, comprising:
   generating a pulse modulation signal that is pulse-modulated such that a detection value of a coil current of the stepping motor approaches a target amount based on a current setting value;
   generating a detection window which becomes an open state at which the coil current of the stepping motor becomes smaller than a predetermined threshold value;
   assigning one output of a full-bridge circuit coupled to the coil of the stepping motor to a high-output state and assigning the other output of the full-bridge circuit to a low-output state when the detection window is in a closed state;
   switching the one output assigned to the high-output state according to the pulse modulation signal and fixing the other output assigned to the low-output state to a low level when the detection window is in the closed state;

setting the outputs of the full-bridge circuit to a high-impedance state when the detection window is in the open state,
detecting a back electromotive force of the coil when the detection window is in the open state; and
feedback controlling the current setting value based on the back electromotive force, wherein the method further comprising:
in advance of detecting a current zero cross, inverting the assignments of the high-output/low-output states to the outputs of the full-bridge circuit respectively in response to a positive edge of the input clock, and stopping switching the output of the full-bridge circuit newly assigned to the high-output state to a high-level with fixing to a high level, so as to reduce the coil current;
setting the detection window to the open state when the coil current crosses the threshold value; and
at the closing of the detection window, restoring the assignments of the high-output/low-output states to the outputs of the full-bridge circuit respectively as in the previous closed state of the detection window, and restarting the switching the output of the full-bridge circuit assigned to the high-output state.

* * * * *